Patented July 4, 1933

1,916,226

UNITED STATES PATENT OFFICE

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE

ZIRCONIUM, SILICON AND ALKALI METAL SOLUTIONS AND METHOD OF MAKING SAME

No Drawing. Application filed October 23, 1931. Serial No. 570,767.

My invention relates to the derivation of zirconium solutions from the decomposition of zirconium ores and minerals, the most important of which is zircon (zirconium silicate).

In the conversion of zirconium minerals to dilute acid soluble compound zirconium silicate is preferably used as the raw zirconium material as it contains zirconium and silicon in proper proportions to yield the double alkali zirconium silicate that is soluble in dilute acids. However, if the raw material consists of a zirconium ore containing both zirconium silicate ($ZrSiO_4$) along with natural zirconium oxide ($ZrO_2$), sufficient silica should be added to bring the $ZrO_2$-$SiO_2$ ratio to correspond with zircon.

Inasmuch as zirconium silicate or zircon is the most abundant zirconium ore and one which occurs in the purer form readily susceptible to pretreatment with chemicals to remove such impurities as iron, titanium, etc., if removal of such impurities is desirable, the treatment of zirconium silicate ($ZrSiO_4$) will be set forth although it is to be understood that my invention is not limited to the treatment of such zirconium silicate. The process might be worked with mixtures of natural or artificial $ZrO_2$ and silica as the starting point, but of course, for purposes of economy the cheaper $ZrSiO_4$ would naturally be used.

It is now well known that zircon ($ZrSiO_4$) is one of the most acid insoluble materials encountered in nature. It is practically insoluble in all inorganic as well as organic acids, and is even not greatly affected by hydrofluoric acid or hot sulphuric acid, or by fused alkali acid sulphate.

Hitherto in obtaining solutions or salts of zirconium various processes have been resorted to in order to bring the zirconium into solution accompanied by separation from accompanying silica compounds. The various prior treatments due to complicated manipulation and the expense from use of large amounts of reagents, etc., resulted in the zirconium salts ultimately obtained being too costly for most practical uses in competition with salts of other metals such as tin salts.

I have now discovered improved methods whereby the acid insoluble zircon is readily and cheaply converted to form readily soluble compounds in dilute acids in amount considerable less than would theoretically be required to combine with zirconium to form the normal zirconium salt with the acid, and with the alkali to form a normal alkali salt with the acid. This is a distinct improvement in the art as it yields new and improved solutions containing no free acid, but rather solutions which might be termed basic in nature which in the mineralizing of textiles of various kinds is a decided advantage in that any free acid is liable to harm the fabric, and also in such solutions containing less than normal amount of acid, the zirconium is likely to be taken up readily by the fabric. The term mineralizing signifies the impregnation of silk, wool, cotton or other natural as well as synthetic textile and other like materials by inorganic compounds so as to increase the weight, or to act as mordants in dyeing operations, or again to render the material less susceptible to fire, etc.

In the zirconium solutions referred to as obtainable by my new and novel methods the silicon is contained in apparent solution along with the zirconium and alkali metal salts, and I have additionally discovered that this solution containing zirconium, silicon and alkali metal salts can be used directly in the treatment of textiles, fabrics, etc. for mineralizing purposes, thereby avoiding the steps necessary incidental to removal of silicon compounds in prior processes with resultant simplicity of processing and economy in the industrial application of zirconium for the purposes intended.

Having in this general way indicated the nature of my discoveries, I now set forth a detailed example of how one starting with zirconium silicate may convert it into a form soluble in dilute acids; also examples of how such acid solutions may be produced; and also an example of how such acid solutions containing zirconium and silicon can be used in the treatment of fabrics, etc., for mineralizing purposes.

Example A

I prefer to use zirconium silicate or zircon ($ZrSiO_4$) of the following analysis although less pure zircon may be used for some purposes.

| | Per cent |
|---|---|
| $ZrO_2$ | 65.82 |
| $SiO_2$ | 33.28 |
| $TiO_2$ | 00.12 |
| $Fe_2O_3$ | 00.11 |
| $Al_2O_3+P_2O_5$ | 00.72 |
| | 100.05 |

The zircon is first milled to such fineness as will render it readily reactive with the alkali, and I find that if such zircon is of a fineness such as will permit 99.90% or thereabouts to pass a U. S. Standard testing sieve No–325, it will be suitable for the purpose.

The dry zircon is used in the following charge.

| | Parts by weight |
|---|---|
| Zircon_____325 mesh | 53 |
| Soda ash (commercial $Na_2CO_3$) | 53 |
| | 106 |

The charge is mixed in a suitable device, and then is run through a disintegrating machine which breaks down and blends the zircon and soda ash mix so as to form a charge in which the two materials are in intimate contact.

This mix is charged in form of fine powder to a suitable furnace and heated to temperature of about 950° C. Such heating is continued until tests show that well over 95% of the $ZrSiO_4$ has been decomposed, and is now in a form soluble in dilute acids. I find that if the heating is not carried on for a sufficient period of time, or at too low a temperature, too much of the zircon is left unaltered. I also find that if heating is too prolonged or at too high a temperature, and reactions set in which in part may defeat my purpose by setting free some of the zirconium as zirconium oxide which is not soluble in dilute acids.

A suitable temperature range I have found to be from 850–950° C., with permissible deviations depending upon type of furnace etc. As to the duration of heating, this will depend upon size of charge and type of furnace. In case of a batch type rotary furnace a temperature of about 950° C. a period of about three hours yields good results. I prefer to use as low a temperature as permissible to give the charge sufficient time to react, but I avoid high temperatures and short heating periods.

The charge as removed from furnace is in the form of relatively soft masses that may be easily crushed. In the example presented the charge was heated in a batch rotary type furnace, but due to draught through the furnace, part of $Na_2CO_3$ was lost as indicated by analysis of roasted product.

In case of a stationary or muffle type furnace less soda ash may be used, for example

| | Parts by weight |
|---|---|
| Milled zircon | 53 |
| Soda ash | 40 |

Using the proportions of material as given in this example the roasted product weighed 80.34 parts and by analysis showed

| | Per cent |
|---|---|
| Zirconium oxide+traces of $TiO_2$ etc. ($ZrO_2+$) | 43.27 |
| Silica ($SiO_2$) | 21.29 |
| Soda ($Na_2O$) | 29.88 |
| Others—mostly $CO_2$ | 5.56 |
| | 100.00 |

When the roasted charge is cool I preferably treat it in the following manner: I charge it to a batch type pebble mill along with water, and mill same for sufficient time to form a fine suspension of the material in water. Such mill charge was made up as follows:—

| | Parts by weight |
|---|---|
| Roasted product | 80.34 |
| Water | 77.26 |

This charge was milled and discharged from the mill when tests showed that practically all passed a 325 mesh sieve.

The charge at this stage consists of a suspension of the water insoluble zirconium and silicon combination with alkali, a minor part of sodium along with a small amount of silicon being in solution along with traces of aluminum and other impurities. For most purposes I prefer to use the product as discharged from the mill, but by washing out the small amount of dissolved alkali and silicon material, etc., a purer product will result. I have found, however, that with the relatively pure zirconium material used in this example, it is usually best to treat the product directly with acid.

This suspension or slurry as discharged from the mill consists substantially of the following composition:—

| | Per cent |
|---|---|
| Zirconium oxide $TiO_2$ etc. ($ZrO_2+$) | 22.05 |
| Silica ($SiO_2$) | 10.85 |
| Soda ($Na_2O$) | 15.20 |
| Carbon dioxide ($CO_2$) | 2.88 |
| Water ($H_2O$) | 49.02 |

To obtain the derived solution by treatment with acids, I may use several acids, but I prefer to use hydrochloric acid or nitric acid.

In the first place the solution can be obtained by adding concentrated hydrochloric acid to the above charge after it has been diluted with water, or dilute acid can be added directly to the charge, or the slurry discharged from the ball mill can be added to dilute acid, or if there were any advantage HCL gas or gaseous nitric acid could be injected into the zirconium material and absorbed therein to absorption of sufficient amount to produce a solution.

I will, however, present examples in which the zirconium containing slurry as described as being the discharge from the ball mill is added to dilute hydrochloric acid in one case, and to dilute nitric acid in the other case.

*Example B*

136.63 parts by weight of hydrochloric acid (35.37% HCL) is diluted with the 363.37 parts by weight of water, and the mixture is preferably warmed to about 60° C. in a suitable container preferably equipped with a mechanical agitator. To this dilute hydrochloric acid solution is added 157.6 parts by weight of the foregoing zirconium silicon slurry; the temperature will rise due to energetic reactions involved, and in a relatively short period of time practically all the zirconium, silicon and alkali metal salts will be dissolved leaving only a small amount of insoluble residue which renders the solution turbid.

The charge is allowed to settle out its insoluble matter, and this residue in the foregoing example amounted only to 1.55 parts by weight showing that about 97% of the zirconium silicate originally introduced into the charge had been brought into solution according to my improved methods described.

The solution may be used for some purposes directly without removal of the small amount of insoluble matter.

The practically clear solution of above example will have approximately the following chemical composition:—

| | Per cent |
|---|---|
| Zirconium oxide + traces of TiO$_2$ etc. ($ZrO_2+$) | 5.20 |
| Silica ($SiO_2$) | 2.40 |
| Sodium oxide ($Na_2O$) | 3.60 |
| Chloride calculated as HCL (HCL) | 7.34 |
| Water ($H_2O$) | 81.46 |

It will be seen that the hydrochloric acid used is only moderately in excess of that theoretically required to form zirconium chloride and not enough to convert both the zirconium and sodium into normal chlorides, but even so, the zirconium and soda have been brought into solution with the silicon also in solution.

For example, the 157.6 parts slurry as discharged from the mill contained 34.75 parts by weight ($ZrO_2+$)
17.10 parts by weight ($SiO_2$)
23.96 parts by weight ($Na_2O$)

34.75 parts $ZrO_2$ requires 41.09 parts HCL to form normal zirconium chloride.

23.96 parts $Na_2O$ requires 28.15 parts HCL to form sodium chloride.

Therefore one would expect to use 69.24 parts of actual HCL, whereas according to my methods only 48.33 parts HCL is sufficient. This is a distinct step in advance and represents one of novel features in this case. This refers to amount of pure HCL used, that is 35.37% of 136.63 parts.

*Example C*

To 119.34 parts by weight of nitric acid (70% $HNO_3$) is added 380.66 parts by weight of water and the charge is warmed to about 60° C.

To this charge is added 157.6 parts by weight of the aforesaid zirconium silicon slurry, and from this point on the process is the same as for the chloride solution. In case of Example C there remained only 1.60 parts by weight of insoluble matter and the clarified solution obtained had the following approximate chemical composition.

| | Per cent |
|---|---|
| Zirconium oxide + traces TiO$_2$, etc. ($ZrO_2+$) | 5.20 |
| Silica ($SiO_2$) | 2.40 |
| Sodium oxide ($Na_2O$) | 3.60 |
| Nitrates calculated as HNO$_3$ ($HNO_3$) | 12.70 |
| Water ($H_2O$) | 76.10 |

Sulphuric acid may also be used and in fact any acid which will dissolve the material leaving the zirconium in form which can be precipitated by potassium salts, phosphates or by alkalies, but generally I prefer to use hydrochloric acid. I have also found that chloride and nitrate solutions are much more stable than those obtained from other acid treatments and therefore would have greater advantages for industrial purposes.

In using these zirconium, silicon and alkali metal solutions in acid, in the treatment of natural as well as synthetic textiles, fabrics, etc. to effect an impregnation of inorganic material to increase the weight or to make less susceptible to effect of flames, or to assist in the fixing of colors, dyes etc., the fabric is immersed in the solution of zirconium, silicon, etc., and by a succession of immersions, rinsings, followed by treatment in fixing baths to fix the zirconium, etc. For instance, after fabric is immersed in zirconium solution, it may be removed, rinsed or drained to remove excess solution, and then immersed in solution of a potash salt or of a phosphate salt or of both, or in an alkali such as ammonia to effect the conversion of zirconium to a water insoluble form. The excess fixing solution is then removed in any suitable manner. If desired the process is repeated a number of times until the desired increase in weight or desired degree of impregnation of the article is obtained.

I claim as my invention:—

1. A method of converting zirconium silicate or zircon into an acid zirconium solution containing silicon and an alkali metal, which comprises heating said zirconium silicate with said alkali to substantially complete decomposition, treating the roasted product with acid in amount less than theoretically required to form normal salts with the zirconium and alkali to solution of silicon and soluble zirconium compounds, and separating the clear acid liquor containing zirconium, silicon and said alkali metal in solution.

2. A method of converting zirconium silicate or zircon into an acid zirconium solution containing silicon and an alkali metal, which comprises heating said zirconium silicate with said alkali to substantially complete decomposition, treating the roasted product with dilute acid in amount less than theoretically required to form normal salts with the zirconium and alkali to solution of silicon and soluble zirconium compounds, and separating the clear acid liquor containing zirconium, silicon and said alkali metal in solution.

3. A method of converting zirconium silicate or zircon into an acid zirconium solution containing silicon and an alkali metal, which comprises heating said zirconium silicate with said alkali to substantially complete decomposition, treating the roasted product with hydrochloric acid in amount less than theoretically required to form normal salts with the zirconium and alkali to solution of silicon and soluble zirconium compounds, and separating the clear acid liquor containing zirconium, silicon and said alkali metal in solution.

4. A method of converting zirconium silicate or zircon into an acid zirconium solution containing silicon and an alkali metal, which comprises heating said zirconium silicate with said alkali to substantially complete decomposition, treating the roasted product with nitric acid in amount less than theoretically required to form normal salts with the zirconium and alkali to solution of silicon and soluble zirconium compounds, and separating the clear acid liquor containing zirconium, silicon and said alkali metal in solution.

5. A method of converting zirconium silicate or zircon into an acid zirconium solution containing silicon and sodium, which comprises heating said zirconium silicate with sodium carbonate to substantially complete decomposition, treating the roasted product with dilute acid in amount less than theoretically required to form normal salts with the zirconium and sodium to solution of silicon and soluble zirconium compounds, and separating the clear acid liquor containing zirconium, silicon and sodium in solution.

6. A method of converting zirconium silicate or zircon into an acid zirconium solution containing silicon and sodium, which comprises heating said zirconium silicate with sodium carbonate to substantially complete decomposition, treating the roasted product with dilute hydrochloric acid in amount less than theoretically required to form normal salts with the zirconium and sodium to solution of silicon and soluble zirconium compounds, and separating the clear acid liquor containing zirconium, silicon and sodium in solution.

7. A method of converting zirconium silicate or zircon into an acid zirconium solution containing silicon and sodium, which comprises heating said zirconium silicate with sodium carbonate to substantially complete decomposition, treating the roasted product with dilute nitric acid in amount less than theoretically required to form normal salts with the zirconium and sodium to solution of silicon and soluble zirconium compounds, and separating the clear acid liquor containing zirconium, silicon and sodium in solution.

8. In the production of acid zirconium solutions containing silicon and an alkali metal, the steps which comprise treating an aqueous zirconium-silicon-alkali solution with dilute acid in amount less than theoretically required to form normal salts with the zirconium and alkali metal, and separating the clear acid liquor therefrom.

9. In the production of acid zirconium solutions containing silicon and sodium, the steps which comprise treating an aqueous zirconium-silicon-sodium solution with dilute acid in amount less than theoretically required to form normal salts with the zirconium and sodium, and separating the clear acid liquor therefrom.

10. In the production of acid zirconium solutions containing silicon and an alkali metal, the steps which comprise treating an aqueous zirconium-silicon-alkali solution with dilute hydrochloric acid in amount less than theoretically required to form normal salts with the zirconium and alkali metal, and separating the clear acid liquor therefrom.

11. In the production of acid zirconium solutions containing silicon and an alkali metal, the steps which comprise treating an aqueous zirconium-silicon-alkali solution with dilute nitric acid in amount less than theoretically required to form normal salts with the zirconium and alkali metal, and separating the clear acid liquor therefrom.

12. As a new article, an acid zirconium solution having silicon and alkali metal salts in solution and containing acid in amount less than theoretically required to form normal salts with the zirconium and alkali metal present.

13. As a new article, an acid zirconium solution having silicon and sodium salts in solution and containing acid in amount less than theoretically required to form normal salts with the zirconium and sodium present.

14. As a new article, a chloride zirconium solution having silicon and alkali metal salts in solution and no free acid.

15. As a new article, a chloride zirconium solution having silicon and sodium salts in solution and no free acid.

16. As a new article, a nitrate zirconium solution having silicon and alkali metal salts in solution and no free acid.

17. As a new article, a nitrate zirconium solution having silicon and sodium salts in solution and no free acid.

CHARLES J. KINZIE.